United States Patent
Scott

(10) Patent No.: US 7,334,973 B2
(45) Date of Patent: Feb. 26, 2008

(54) COMPRESSIBLE CARGO BAR

(75) Inventor: Gary M. Scott, Milwaukie, OR (US)

(73) Assignee: Burns Bros., Inc., Lake Oswego, OR (US)

( * ) Notice: Subject to any disclaimer, the term of this patent is extended or adjusted under 35 U.S.C. 154(b) by 0 days.

(21) Appl. No.: 11/218,984

(22) Filed: Sep. 2, 2005

(65) Prior Publication Data

US 2006/0051179 A1     Mar. 9, 2006

Related U.S. Application Data

(60) Provisional application No. 60/607,721, filed on Sep. 7, 2004.

(51) Int. Cl.
*B60P 7/08*     (2006.01)

(52) U.S. Cl. ........................................ 410/151; 410/143

(58) Field of Classification Search ................ 410/143, 410/145, 151; 211/105.3; 248/354.6, 615, 248/354.7, 616; 254/108, 247; 74/143, 74/167

See application file for complete search history.

(56) References Cited

U.S. PATENT DOCUMENTS

| 4,781,499 A | 11/1988 | Wisecarver |
| 5,769,580 A * | 6/1998 | Purvis .................... 410/151 |
| 6,755,600 B2 | 6/2004 | Scott |
| 2003/0082024 A1* | 5/2003 | Scott .......................... 410/151 |

* cited by examiner

*Primary Examiner*—Stephen Gordon
(74) *Attorney, Agent, or Firm*—Schwabe, Williamson & Wyatt, P.C.

(57) ABSTRACT

A cargo bar for retaining loads in a cargo container having opposing side walls. The cargo bar includes telescoping sections and end devices at the opposed ends of the cargo bar. The end devices are elastameric and absorb excessive forces that induce pressure grip extension of the telescoping sections.

13 Claims, 2 Drawing Sheets

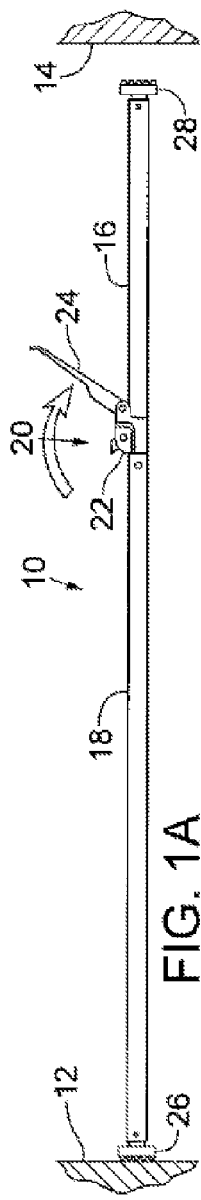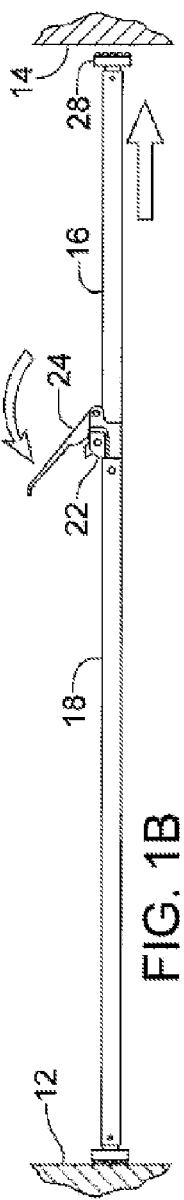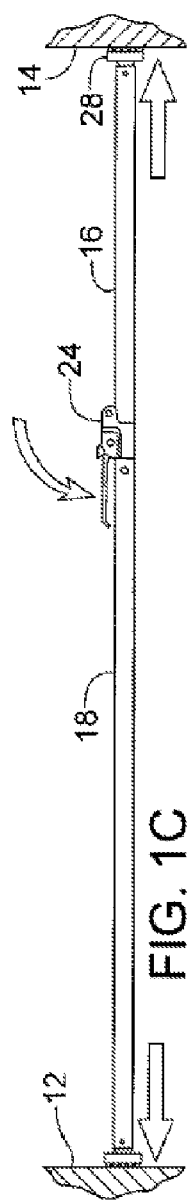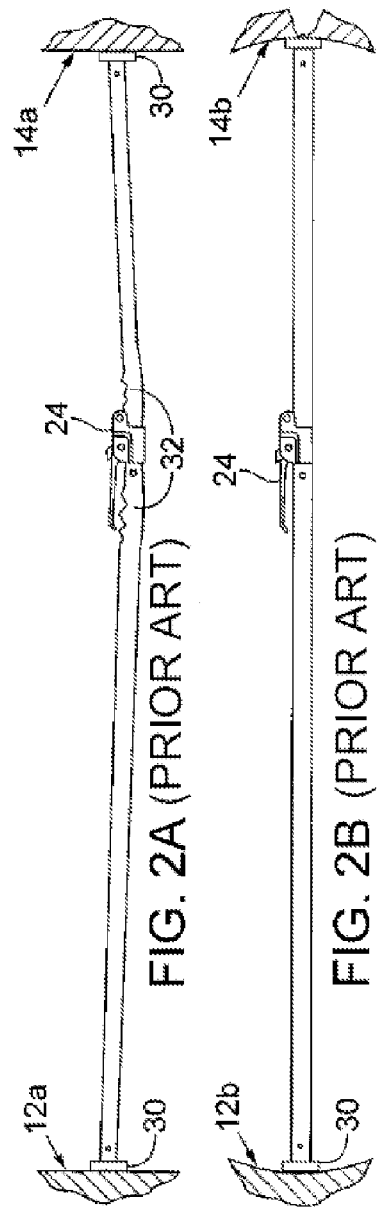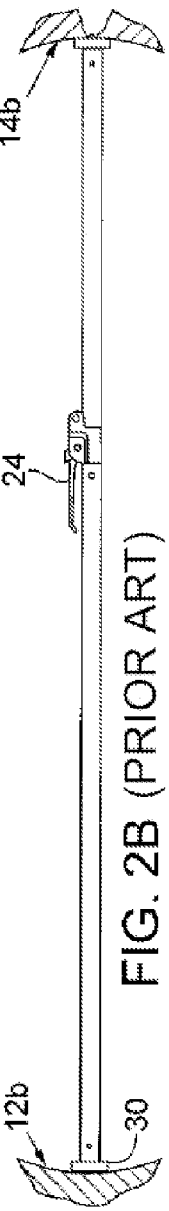

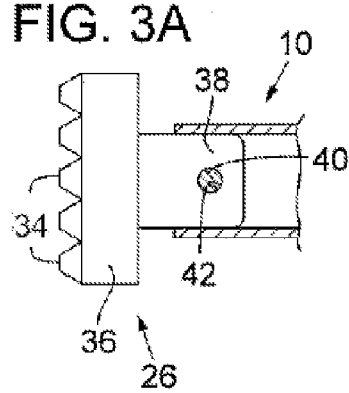
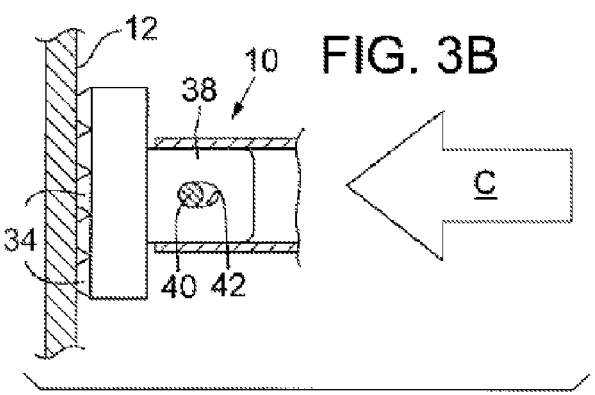
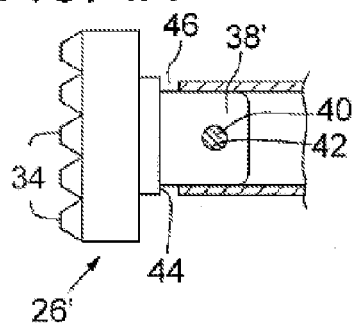
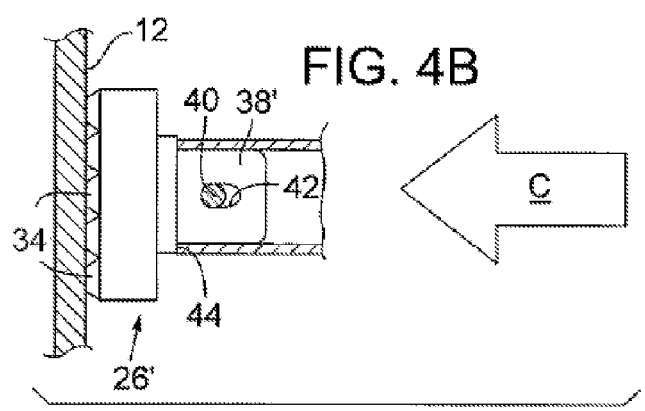
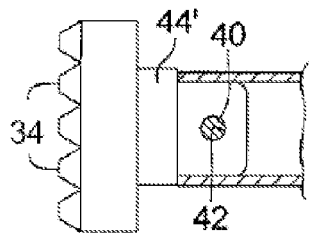
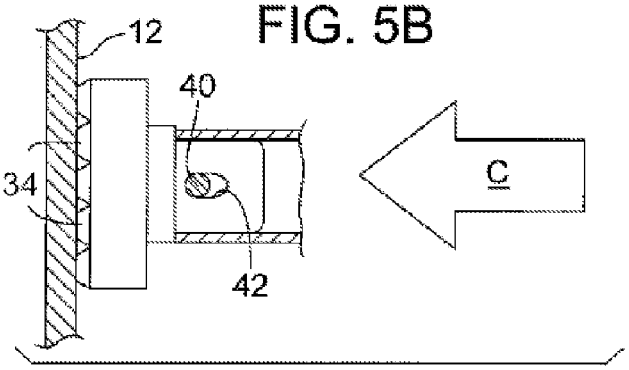

COMPRESSIBLE CARGO BAR

RELATED APPLICATION

The present invention is a Non-Provisional Application of Provisional Application No. 60/607,721 filed Sep. 7, 2004 entitled "Compressible Foot Member for Friction Type Cargo Stabilization Devices," claims priority to said provisional application, and incorporates its specification in its entirety by reference.

FIELD OF THE INVENTION

This invention relates to the use of extendable cargo bars that are forcibly extended between opposing wall surfaces for pressure induced grip retention of the bars to the walls.

BACKGROUND OF THE INVENTION

The use of cargo bars for sectioning off cargo loads is well known. Typically, a cargo carrying truck box has opposed side walls and often it happens that a partial load needs to be transported and that cargo load likely needs to be held in place in the truck box. Cargo bars are elongate extendable/contractible members (e.g., telescoping square tubes) having end pads that can be forcibly pressed against the side walls to grip the flat surfaces of the side walls and hold the cargo bars in place. The bar is butted against the partial load and the ends of the cargo bar pressed into the side walls to fix the bar and thereby retain the load. It will be apparent that although such use is a typical use of the "cargo bar" there are many applications and this description is intended to provide an understanding of the inventive concept and is not intended to limit the applicability of the product of this invention.

The cargo bar as explained above relies on opposing pressure gripping end portions and typically encompasses thin rubber or elastameric pads at the opposed ends which function as a slip resistant facing and also to avoid damage to the opposing walls. An important characteristic of truck box application for the cargo bars of the prior art is that the walls will resistively flex to enhance or generate ongoing pressure gripping.

As explained the applications for the cargo bar varies and one important consideration is the use of the bar in applications where the opposing walls do not resistively flex. In such instances the forced expansion can cause damage e.g., to the non-flexing side walls or to the cargo bar itself.

BRIEF DESCRIPTION OF THE INVENTION

A previously proposed solution to this problem is to incorporate metal springs into the cargo bar ends i.e., between the rigid end of the bar and the elastameric pad. Such incorporated springs has not been deemed satisfactory. The spring components add considerable expense and complexity. Also, the resistive force of the spring must be reliably sufficient to produce the necessary gripping force and yet have a predictable release to avoid buckling of the bar and/or opposing walls. This criteria has not been satisfactorily achieved by existing metal spring mechanism and has prompted the present invention.

The present invention is believed to solve the deficiencies of the metal springs by the provision of molded rubber bar end devices. The molded rubber bar end devices may be referred to as bar end feet and are configured to fit the bar ends and as fitted to the bar ends, may provide varying degrees of resistive deformation. Such devices can be produced of differing durometers for adapting the bars to differing applications. That is, where the structure of the walls and the cargo bar are substantial and the bars are needed to provide equally resistive cargo retention, the devices will accordingly be provided with a durometer that deforms only when subjected to high forces. The durometer will be reduced where the bar and/or walls are more fragile. Further, the design of the devices can be tailored to produce different levels of resistance.

The above invention as briefly explained will be more fully understood and appreciated upon reference to the following detailed description and the drawings referred to therein.

DESCRIPTION OF THE DRAWINGS

FIGS. 1A, 1B, and 1C illustrate a use of the cargo bar for securing a load;

FIGS. 2A and 2B are prior art devices that are in a failed condition;

FIGS. 3A and 3B illustrate the securement devices of the present invention;

FIGS. 4A and 4B illustrate a different embodiment of the invention; and

FIGS. 5A and 5B illustrate a further variation of the invention.

DETAILED DESCRIPTION OF PREFERRED EMBODIMENTS

FIGS. 1A, 1B and 1C illustrate the application of a cargo bar 10 being applied between opposing side walls 12, 14. The cargo bar 10 includes telescoping square tubes having a smaller sized tube 16 slideable into a larger sized tube 18. A locking device 20 is of conventional design and includes a releasable ratchet wheel 22 and hand lever 24. Ratchet teeth formed on the small tube are engaged by the ratchet wheel and as the lever 24 is manually pivoted e.g., from the position of FIG. 1A to the position of 1B and then to FIG. 1C, the bar length is extended (compare the bar length of FIG. 1A to that of FIG. 1C).

In operation, the lever 24 is pivoted to the forward most position (FIG. 1A) where the teeth of the wheel 22 disengage from the teeth of tube 16. The tube section 16 is manually pulled to extend the bar length until the ends substantially span the distance between walls 12, 14, and then the handle 24 is pivoted to force pressure engagement of both bar ends 26, 28 against walls 12, 14. During this procedure and with lever 24 only partially thrown, the bar ends will fully engage the walls 12, 14. A final forced pivoting of the lever 24 produces pressure retentive locking of the bar to the walls.

FIGS. 2A and 2B represent problems that may occur with the cargo bar as generally described above. In FIG. 2A the walls 12A and 14A are rigid. Whereas the bar ends have a thin elastameric pad 30, they provide insufficient give for the overthrow of lever 24, and with the successful forcing of level 24 to the closed position, such may result in the buckling of the bar as illustrated at reference 32. FIG. 2B illustrates a more flimsy wall structure 12B, 14B. The forced closing of lever 24 may result in the wall being forced beyond its elastic resistivity and thus formed into a permanent bow (see wall 12B), or the wall may fracture as shown at wall 14B.

Reference is now directed to FIGS. 3 through 6 which illustrate in more detail the improvement of the present invention. In FIG. 3A the entire bar end 26 is an elastamer of a determined durometer and includes gripping nodules 34 formed on the outer face of an elastameric block 36 and having an elastameric connecting flange 38. The flange 38 is configured to fit the end opening of tubes 16, 18. A pin or bolt 40 extends through a hole in the tube end and through an aligned hole 42 in the flange 38 for securing the bar end 26 to the tube end.

FIG. 3B illustrates the reaction of the bar end 26 to forced engagement of cargo bar 10 with walls 12 and 14. Whereas the entire bar end 26 will collapse or compress to some degree, the smaller sections of the segments will at least initially bear the brunt of the compression. Note that nodules 34 are visibly compressed and hole 42 is visibly elongated, i.e. flange 38 is forced further into the tube end. This activity occurs when a wall structure 12, 14 has a greater resistance to the engaging force C then does the elastameric resistance of the bar end 28.

From the above it will be appreciated that the bar end 26 and the design of the bar end (both structural design and durometer of the elastamer) can be varied to produce greater or lesser force absorption as compared to the resistive force of the walls 12, 14. An example of such design modification structurally is illustrated in FIG. 4. Note that, as compared to the design of FIG. 3, the flange 38 includes a shoulder segment 44.

In FIG. 4A, prior to forced engagement of the bar end 26' with wall 12, there is a space 46 between the tube end and the shoulder segment 44. Following initial engagement and compression of the nodules 34 and elongation of flange hole 42, the space 46 is closed and the tube end engages the shoulder segment 44 as shown in FIG. 4B. At this point the resistance to further compression of the bar end 26' is enhanced.

FIGS. 5A and 5B illustrate a modification to the bar end of FIG. 4 whereby the spacing 46 is eliminated (shoulder 44' is longer and abuts the tube end in the non compressed state). The various segments of the bar ends 26, 26' can be reconfigured as desired to have a different pattern of resistance. It is further repeated with the elastamer itself can be modified to have a different durometer and again provide different patterns of resistance.

In conclusion, the concept of the invention is the provision of an elastameric bar end that is tailored to produce a desired compressibility that (a) achieves resistive retention of the cargo bar as applied to opposing walls of a structure, while (b) protecting the wall structure and/or bar structure against a destructively high locking extension via forced closing of the bar's lever.

This concept is believed unique to the design of cargo bars and solves a major concern for users without substantial cost increases. Within the confines of this unique concept, those skilled in the art will likely conceive of numerous modifications and variations without departing from the essence of the invention. Accordingly, such variations and modifications are intended to be encompassed within the broadly defined terms of the claims appended hereto.

The invention claimed is:

1. A support member adapted to help restrain cargo movement comprising:
    an extendable support member
    a support end gripping member having
        a first end adapted to grippingly engage a side member;
        a second end including a flange made of resilient material that helps couple the support end gripping member to an end of the extendable support member such that upon transmission of a force caused at least in part by an overthrow distance on the support end gripping member by the extension of the extendable support member, the support end gripping member will deform enough to absorb the force caused by the overthrow distance and achieve locking of the support member between the side member and an opposing side member.

2. The support member of claim 1, wherein the support end gripping member is made at least in part of a resilient material that provides resistive absorption of said overthrow distance and further induces pressure gripping of the support member to opposing side members.

3. The support member of claim 1, wherein the first end includes gripping nodules adapted to grippingly engage the side member and compress upon transmission of the force caused by the overthrow distance.

4. The support member of claim 1, wherein the flange is secured in the end of the extendable support member by a retaining member passing through a hole in the flange, whereby transmission of the force caused by the overthrow distance causes an elongation of the hole in the flange.

5. The support member of claim 1, wherein a desired gripping pressure is determined, and the support end gripping member is configured to absorb a gripping pressure that exceeds the desired gripping pressure.

6. The support member of claim 1, wherein the flange further comprises a shoulder adapted to engage the end of the extendable support member.

7. The support member of claim 6, wherein the shoulder is spaced a selected distance away from the end of the extendable support member when no force is being transmitted such that the flange will be able to compress the selected distance before the shoulder engages the end of the extendable support member.

8. The support member of claim 7, wherein the shoulder is a resilient material that is adapted to deform upon engagement with the end of the extendable support member end to help absorb the force.

9. The support member of claim 6, wherein the shoulder is touching the end of the extendable support member end when there is no force being transmitted, the shoulder being adapted to deform upon transmission of the force.

10. A support end gripping member comprising:
    a first end adapted to grippingly engage a side member;
    a second end including a flange made of a resilient material that is adapted to couple the support end gripping member to an end of a support member such that upon transmission of a force on the support end gripping member by the support member, the support end gripping member will deform enough in a generally linear fashion with respect to a longitudinal axis of the support member to absorb the force caused by an overthrow distance and achieve locking of the support member between opposing side members.

11. A support member adapted to help restrain cargo movement comprising:
    an extendable support member
    a support end gripping member having
        a first end adapted to grippingly engage a side member;
        a second end including a flange made of resilient material that helps couple the support end gripping member to an end of the extendable support member such that upon transmission of a force caused by an overthrow distance on the support end gripping member by the extension of the extendable support member, the support end gripping member will deform enough to absorb the force caused by the overthrow distance and achieve locking of the support member between the side member and an opposing side member; and wherein the flange is secured in the end of the extendable support member by a retaining member passing through a hole in the flange, whereby transmission of the force caused by the overthrow distance causes an elongation of the hole in the flange.

12. The support end gripping member of claim 10 wherein the flange is secured in the end of the support member by a retaining member passing through a hole in the flange, whereby transmission of the force caused by the overthrow distance causes an elongation of the hole in the flange.

13. The support end gripping member of claim 11 wherein the first end includes gripping nodules adapted to grippingly engage a side member and compress upon transmission of the force caused by the overthrow distance.

* * * * *

UNITED STATES PATENT AND TRADEMARK OFFICE
CERTIFICATE OF CORRECTION

PATENT NO. : 7,334,973 B2  Page 1 of 1
APPLICATION NO. : 11/218984
DATED : February 26, 2008
INVENTOR(S) : Gary M. Scott It is certified that error appears in the above-identified patent and that said Letters Patent is hereby corrected as shown below:

Column 6
Line 4 Claim 13, "...13. The support end gripping member of claim 11..." should read Claim 13 --...13. The support end gripping member of claim 10...--.

Signed and Sealed this

Twenty-sixth Day of May, 2009

JOHN DOLL
*Acting Director of the United States Patent and Trademark Office*